(12) United States Patent
Kempf

(10) Patent No.: US 9,810,355 B2
(45) Date of Patent: *Nov. 7, 2017

(54) FACE-TO-FACE POSITIVE RESTRAINED ROTATING PIPE FLANGE

(71) Applicant: Kenneth J. Kempf, Omaha, NE (US)

(72) Inventor: Kenneth J. Kempf, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/412,952

(22) Filed: Jan. 23, 2017

(65) Prior Publication Data

US 2017/0130880 A1     May 11, 2017

Related U.S. Application Data

(63) Continuation-in-part of application No. 14/137,502, filed on Dec. 20, 2013, now Pat. No. 9,551,446.

(51) Int. Cl.
*F16L 23/00* (2006.01)
*F16L 23/032* (2006.01)

(52) U.S. Cl.
CPC .......... *F16L 23/003* (2013.01); *F16L 23/032* (2013.01)

(58) Field of Classification Search
CPC . F16L 23/02; F16L 23/08; F16L 21/08; F16L 23/023; F16L 23/024
USPC .......................................... 285/27
See application file for complete search history.

(56) References Cited

U.S. PATENT DOCUMENTS

| | | | |
|---|---|---|---|
| 863,887 A * | 8/1907 | Stuttle | F16L 21/06 24/279 |
| 974,975 A | 11/1910 | Kelly | |
| 1,817,289 A | 8/1931 | Benz | |
| 1,913,030 A * | 6/1933 | Hux | E21B 33/12 166/196 |
| 2,669,467 A | 2/1954 | Wolferz | |
| 2,784,990 A | 3/1957 | Pollia | |
| 2,911,239 A * | 11/1959 | Marzolf, Sr. | F16L 23/0283 285/368 |
| 3,433,509 A | 3/1969 | Jeffery et al. | |
| 3,439,947 A | 4/1969 | Luckenbill | |
| 3,761,114 A | 9/1973 | Blakeley | |
| 3,909,049 A | 9/1975 | Blatnica | |
| 4,200,407 A * | 4/1980 | Bianco | B21B 31/07 403/261 |
| 4,203,475 A | 5/1980 | Corey | |
| 4,601,495 A | 7/1986 | Webb | |
| 4,714,091 A | 12/1987 | Wagner | |
| H000439 H | 3/1988 | Rehn | |
| 4,832,383 A | 5/1989 | Roussel | |

(Continued)

*Primary Examiner* — Beth Stephan
(74) *Attorney, Agent, or Firm* — Suiter Swantz pc llo

(57) ABSTRACT

An annular ductile iron flange of nominal size has a non-threaded inner longitudinal surface defining an inner diameter that exceeds the outer diameter of a corresponding length of hubless ductile iron pipe of nominal thickness. The flange also has a basal surface with both a plurality of evenly spaced bolt holes and an annular counterbore adjacent to the inner longitudinal surface. The counterbore has a longitudinal depth slightly larger than the nominal thickness and a radial depth slightly larger than twice the nominal thickness. The flange is coupled to, and configured to rotate longitudinally around, the length of pipe. The bell end of the pipe is machined to an annular stub configured to recess into the counterbore. A threaded annular ductile-iron flange may be screwed onto the spigot end of the pipe.

5 Claims, 16 Drawing Sheets

(56) References Cited

U.S. PATENT DOCUMENTS

| | | | |
|---|---|---|---|
| 5,018,769 A | 5/1991 | Albrecht | |
| 5,398,980 A | 3/1995 | Hunter | |
| 5,509,699 A | 4/1996 | Himmelberger | |
| 5,524,672 A * | 6/1996 | Mosing | B65D 59/00 138/110 |
| 5,645,301 A | 7/1997 | Kingsford | |
| 6,264,251 B1 * | 7/2001 | Kunsman | F16L 23/032 285/405 |
| 6,315,335 B1 * | 11/2001 | Seedorff | F16L 23/0283 285/412 |
| 6,502,867 B2 | 1/2003 | Holmes, IV | |
| 6,974,160 B2 | 12/2005 | Jones | |
| 7,111,876 B2 * | 9/2006 | Hayashi | F16L 23/032 285/415 |
| 8,267,438 B2 * | 9/2012 | Radzik | F16L 23/0286 277/626 |
| 2007/0007768 A1 | 1/2007 | Ho | |
| 2011/0214755 A1 | 9/2011 | Kesler | |
| 2013/0169080 A1 | 7/2013 | Salamah | |

* cited by examiner

FACE-TO-FACE POSITIVE RESTRAINED ROTATING PIPE FLANGE

CROSS-REFERENCE TO RELATED APPLICATIONS

The present application claims priority under 35 U.S.C. §120 as a continuation-in-part of U.S. patent application Ser. No. 14/137,502, filed Dec. 20, 2013, entitled FACE-TO-FACE POSITIVE RESTRAINED ROTATING PIPE FLANGE, projected to issue on Jan. 24, 2017 as U.S. Pat. No. 9,551,446. Said U.S. patent application Ser. No. 14/137,502 is herein incorporated by reference in its entirety.

TECHNICAL FIELD

This invention relates to flanges, fittings, and other means of securely connecting lengths of pipe for water, wastewater, fire protection, and other applications.

BACKGROUND

A flange may be a cast iron (gray iron or ductile iron) plate of nominal size, generally annular in shape, designed to connect lengths of centrifugally cast gray-iron or ductile-iron pipe of corresponding nominal size. A flange of a given nominal size (generally expressed in inches for North American flanges and pipes) may also have a nominal outer diameter. A length of cast iron pipe of a given nominal size may have a nominal outer diameter, a minimum nominal thickness depending on its rated water pressure, and a nominal allowance for casting tolerance. A flange may be incorporated into a length of cast iron pipe. The flange may also be a separate annular plate coupled to a length of pipe via threading. Taper pipe threads on the internal surface of the flange correspond to threads on the external surface of the pipe. Two lengths of pipe may be connected by bolting or screwing the corresponding flanges to each other, face to face, through a plurality of bolt holes evenly distributed in a concentric circle around the perimeter of the flange. The exact size and number of bolt holes will depend on the nominal size of the flange. A gasket positioned between the two flanges, also annular in shape and fashioned from rubber or a like material, may seal the connection.

"Corresponding pipe" and "corresponding flange" refer to the fact that ductile iron flanges of nominal size are standardized to fit ductile iron pipe of the same nominal size. For example, ANSI/AWWA C115/A21.15-11, which is incorporated by reference herein in its entirety, provides that North American ductile iron pipe of 8-inch nominal size may correspond to a standard flange of 8-inch nominal size having an outer diameter of 13.5 inches and eight evenly spaced circular bolt holes of ⅞-inch diameter.

On a large scale construction project, which may involve multiple flanged connections as pipes are run into buildings, through walls, etc., "two-holing" is standard practice to ensure that any two flanges or flanged pipe spools of a given nominal size are properly aligned. A flange is properly two-holed when a horizontal centerline connecting the top two bolt holes lies perpendicular to the vertical centerline of the pipe. Section 4.4.4 of ANSI/AWWA C115/A21.15-11 provides that misalignment of corresponding bolt holes of the two flanges should not exceed 0.12 inch measured from like points on bolt holes. Similarly, flange faces should be perpendicular to the pipe centerline and parallel, such that face-to-face dimensions at opposite points on the outer diameter of the flanges do not differ by more than 0.06 inch. When flanges are properly aligned, any connecting valves, hydrants, fittings, etc. should fit uniformly.

Problems arise when flanges and pipe spools are improperly two-holed or misaligned, which may happen for a variety of reasons including but not limited to misaligned plant walls, improperly poured concrete floors, inaccurate equipment specifications, or simple human error. In response to an improperly aligned flange, a builder may tear down and rebuild a wall, pull up and re-pour a floor, or order a new pipe spool piece. Any of these courses of action may lead to delayed completion, increased expenses, or both. Where an improperly two-holed flange may be only slightly misaligned with its companion flange, however, the builder may force a connection of the two flanges, bolting them together at an improper angle. A forced connection may appear to resolve the problem of two misaligned flanges but only conceals and complicates the problem, leading to increased potential for leaking (and further flange alignment issues) at multiple pipe joints. Leaks may only be discovered long after the building has been completed and the builders have left. Equipment suppliers, rather than pipefitters, may be called to account for these leaks. While several solutions to the problem of improper two-holing have been developed, these solutions may present new challenges.

SUMMARY

A modified rotating pipe flange, and an apparatus incorporating the same, is disclosed. An annular ductile iron pipe flange has a smooth inner surface whose inner diameter slightly exceeds the outer diameter of a ductile iron pipe spool of the corresponding nominal size. One face of the flange may include around its inner surface an annular counterbore. The flange may be configured to rotate freely around the outer diameter of a corresponding length of pipe.

An apparatus for ameliorating misalignment of flanged connections of ductile-iron pipe comprises a pipe spool piece with a flared bell end and a threaded spigot end. The bell end is machined to an annular pipe stub. The modified flange is coupled to the pipe spool piece so that the pipe stub may recess into the annular counterbore, flush with the face of the modified flange. An internally threaded annular ductile iron pipe flange of the same nominal size is then screwed onto the spigot end of the pipe spool piece. The modified flange is configured to rotate freely around the pipe spool piece, its lateral movement restrained by the flange on the spigot end, until it is bolted to a connecting flange.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The advantages of the invention may be better understood by those skilled in the art by reference to the accompanying figures in which.

DETAILED DESCRIPTION OF EXEMPLARY EMBODIMENTS

Features of the present invention in its various embodiments are exemplified by the following descriptions with reference to the accompanying drawings, which describe the present invention with further detail. These drawings depict only selected embodiments of the present invention, and should not be considered to limit its scope in any way.

Figure 1A:
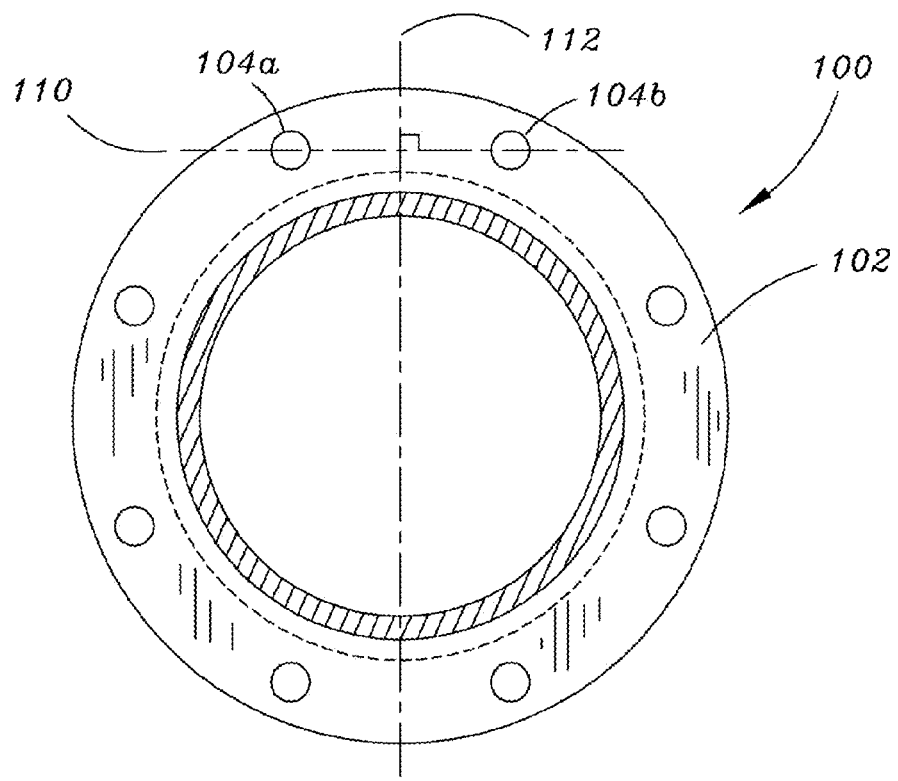
FIG. 1A is an illustration of a properly two-holed flange.

The present invention is a novel solution to the problems of improper two-holing and forced connection of misaligned flanges. FIG. 1A depicts a standard annular flange 100, properly two-holed. Standard flanges and modified flanges in accordance with an embodiment of the present invention may be fashioned from ductile iron and conform to specifications outlined in ANSI/AWWA C115/A21.15-11 and ANSI/AWWA C150/A21.50-08, the latter of which is herein incorporated by reference in its entirety. Bolt holes 104(a), 104(b), . . . are arranged in a concentric circle around the perimeter of the face 102 of flange 100. When flange 100 is properly two-holed, the common horizontal centerline 110 of the top two bolt holes 104(a) and 104(b) (i.e., the bolt holes nearest the top of flange 100) will lie perpendicular to the vertical centerline 112 of flange 100. Any further valves, pipes, or other fittings connected to flange 100 will fit uniformly with flange 100 if the corresponding flange is also properly two-holed in this way.

Figure 1B:
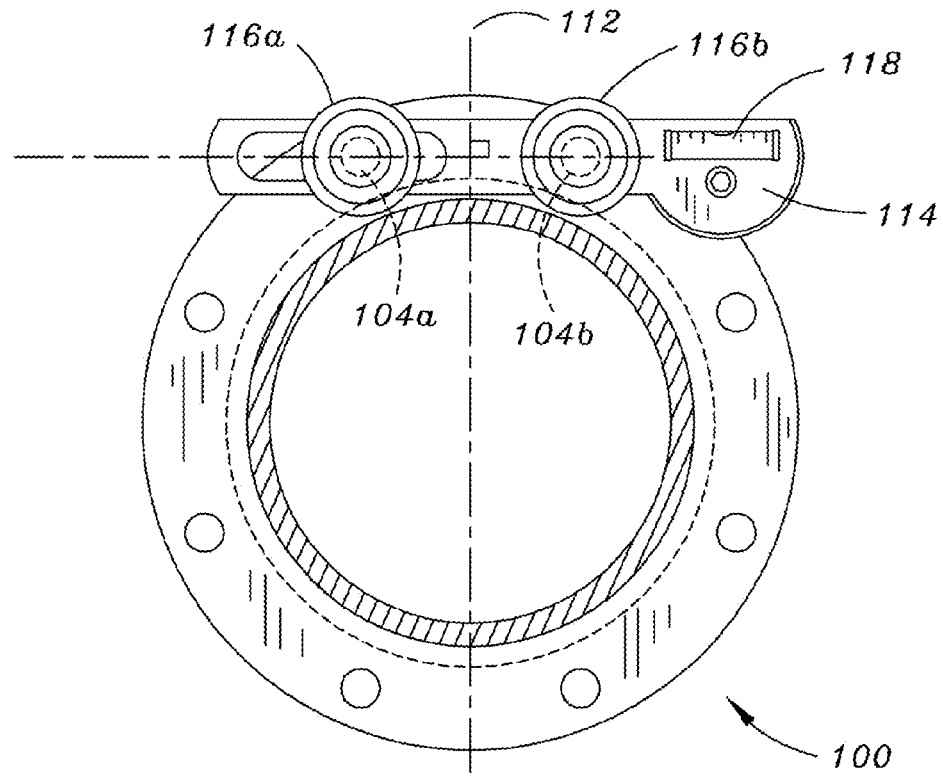
FIG. 1B is an illustration of a properly two-holed flange.

FIG. 1B demonstrates verification of a properly two-holed flange: two pins 116(a), 116(b) may be inserted in bolt holes 104(a), 104(b) and level 114 coupled to pins 116(a) and 116(b). The horizontal centerline 110 of bolt holes 104(a) and 104(b) lies perpendicular to the vertical centerline 112 of flange 100. The position of level bubble 118 shows that level 114 is horizontally aligned, and thus flange 100 is properly two-holed.

Figure 1C:
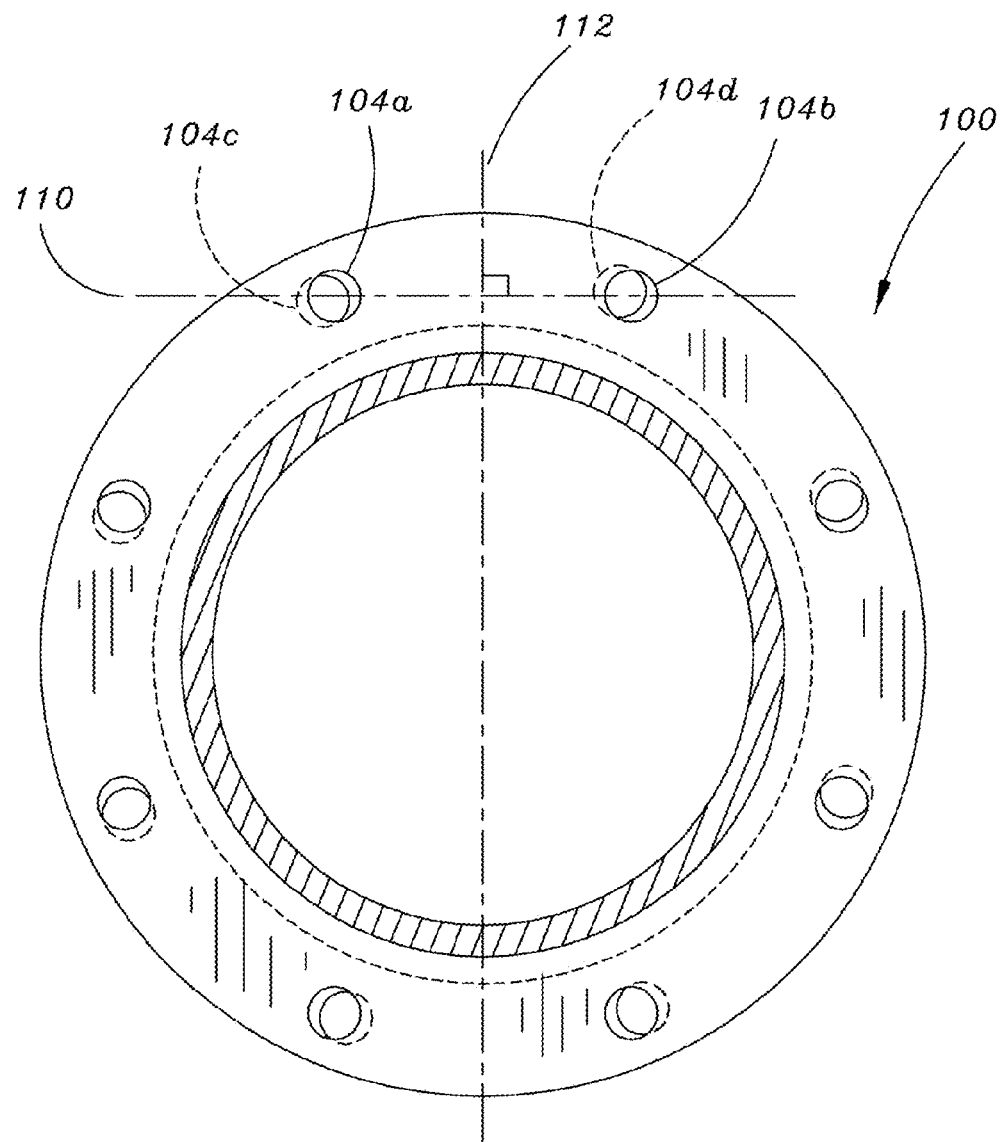
FIG. 1C is a front view of a pair of improperly two-holed or misaligned flanges.

FIG. 1C depicts a standard flange 100 misaligned with a second flange or flanged pipe (behind flange 100 and thus not shown) that has not been properly two-holed. The centerline 110 of bolt holes 104(a) and 104(b) lies perpendicular to vertical centerline 112 of flange 100. Bolt holes 104(c) and 104(d) of the rear flange, however, are not aligned with bolt holes 104(a) and 104(b), nor are they aligned with vertical centerline 112. If two connecting flanges are not properly aligned, a secure pipe joint cannot be guaranteed. Rather than pull down a wall, pull up a floor, or wait for a replacement pipe spool, if the misalignment between two flanges is small enough, the bolts may simply be forced through both sets of holes.

Figure 2A:
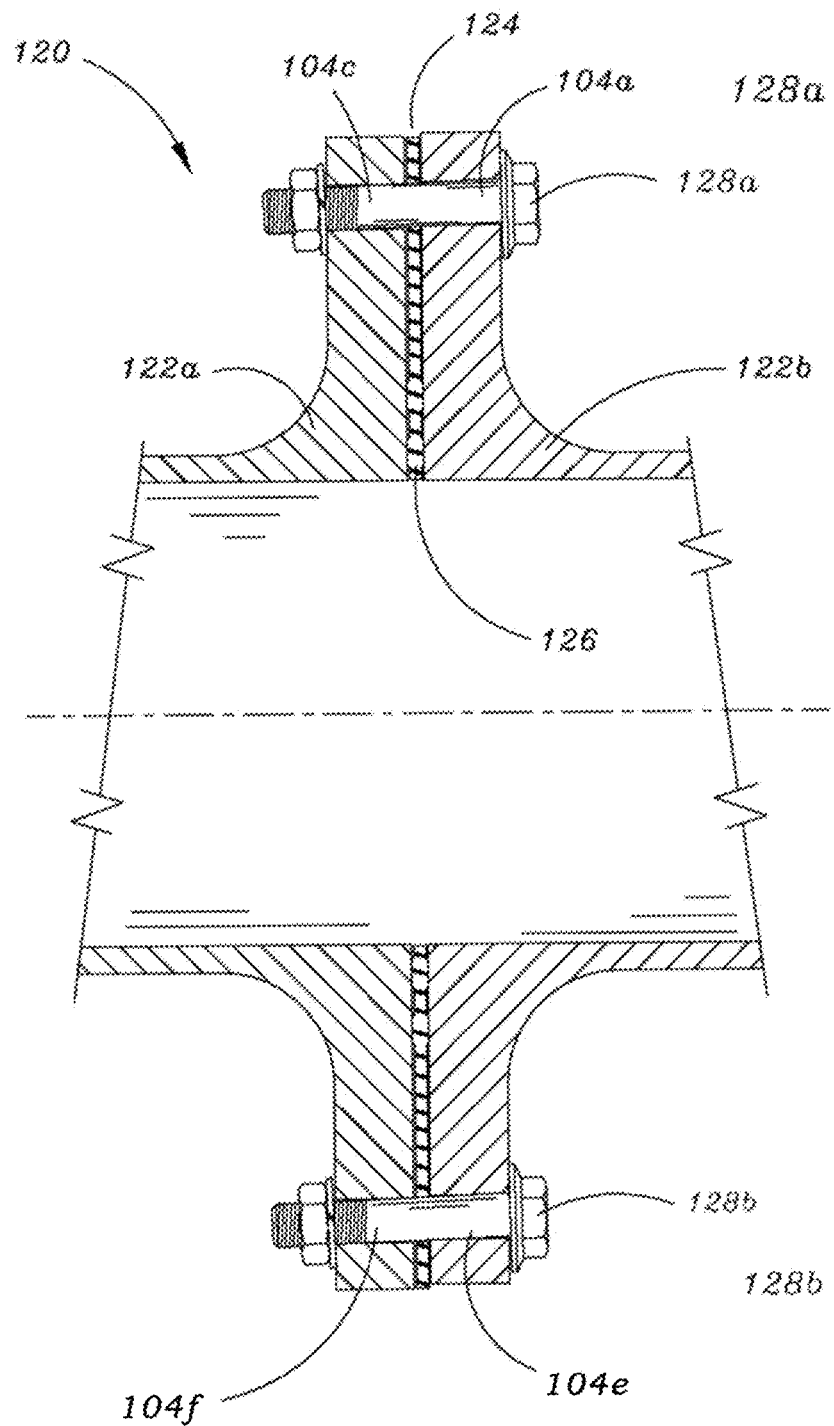
FIG. 2A is a prior art cross section of a forced connection of two misaligned flanges.
Figure 2B:
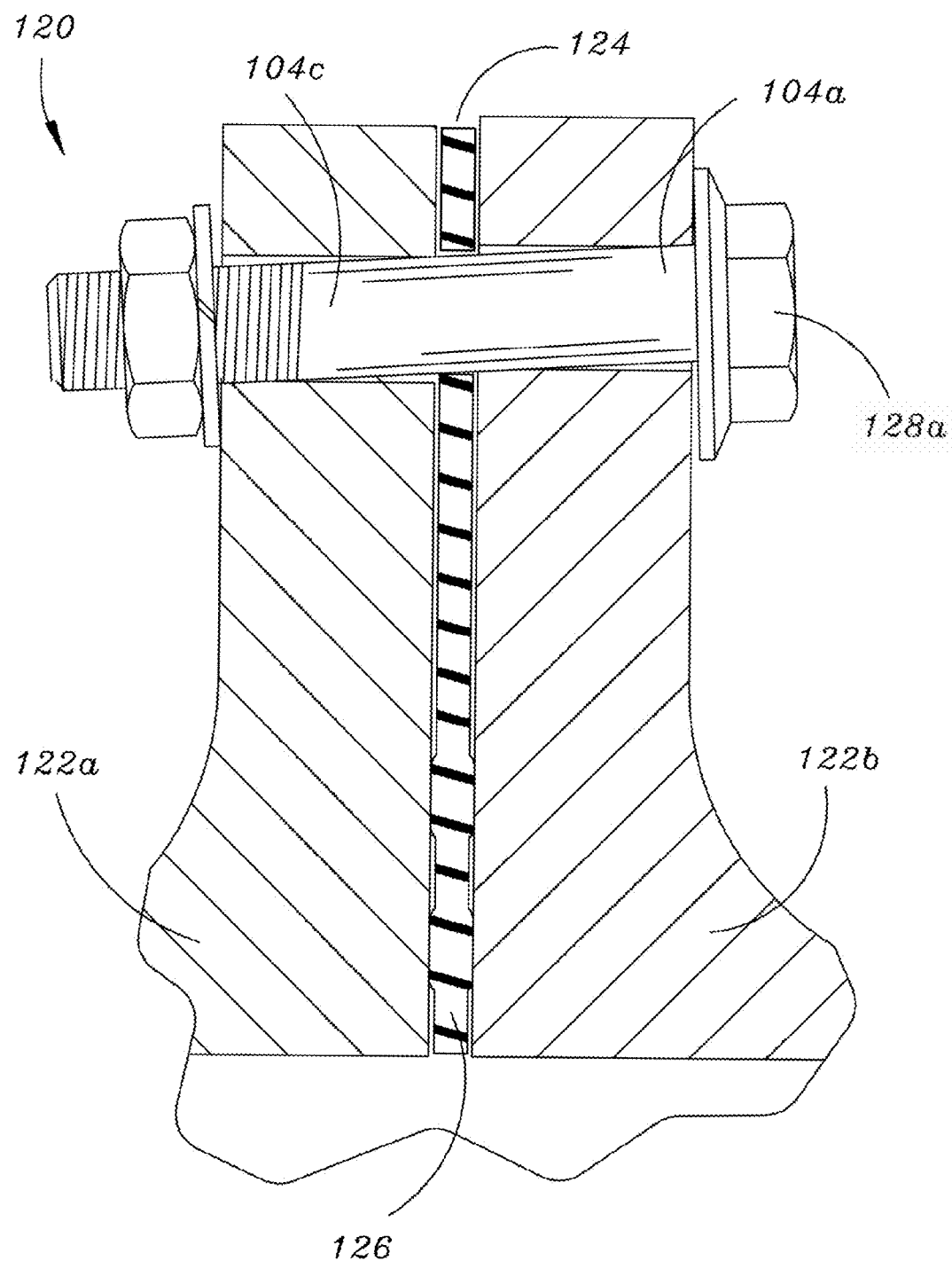
FIG. 2B is a prior art cross section of a forced connection of two misaligned flanges.

FIGS. 2A and 2B depict a prior art cross section of a forced connection 120 between two misaligned flanged pipe sections 122(a) and 122(b). Annular gasket 124, which may comprise a molded elastomer, rubber, thermoplastic, or other like material, may be positioned between two flanges to seal a pipe joint. Gasket 124 may include holes corresponding to the bolt holes of corresponding flanges, and may further include one or more concentric raised rings 126 on the face of the gasket to guarantee the seal to a given working pressure and reduce the bolt torque necessary to secure flanged pipe sections 122(a) and 122(b). Because flanged pipe sections 122(a) and 122(b) are not properly aligned, however, bolts 128(a) and 128(b) may connect bolt holes 104(a) to 104(f) and 104(e) to 104(d) at an improper angle. A secure seal cannot be guaranteed to the necessary working pressure; bolts 128(a) and 128(b) may face increased stress and pipe joint 120 may be more likely to leak or fail than a properly aligned pipe joint or connection. In the short term, none of these problem factors may be immediately apparent.

Figure 3:
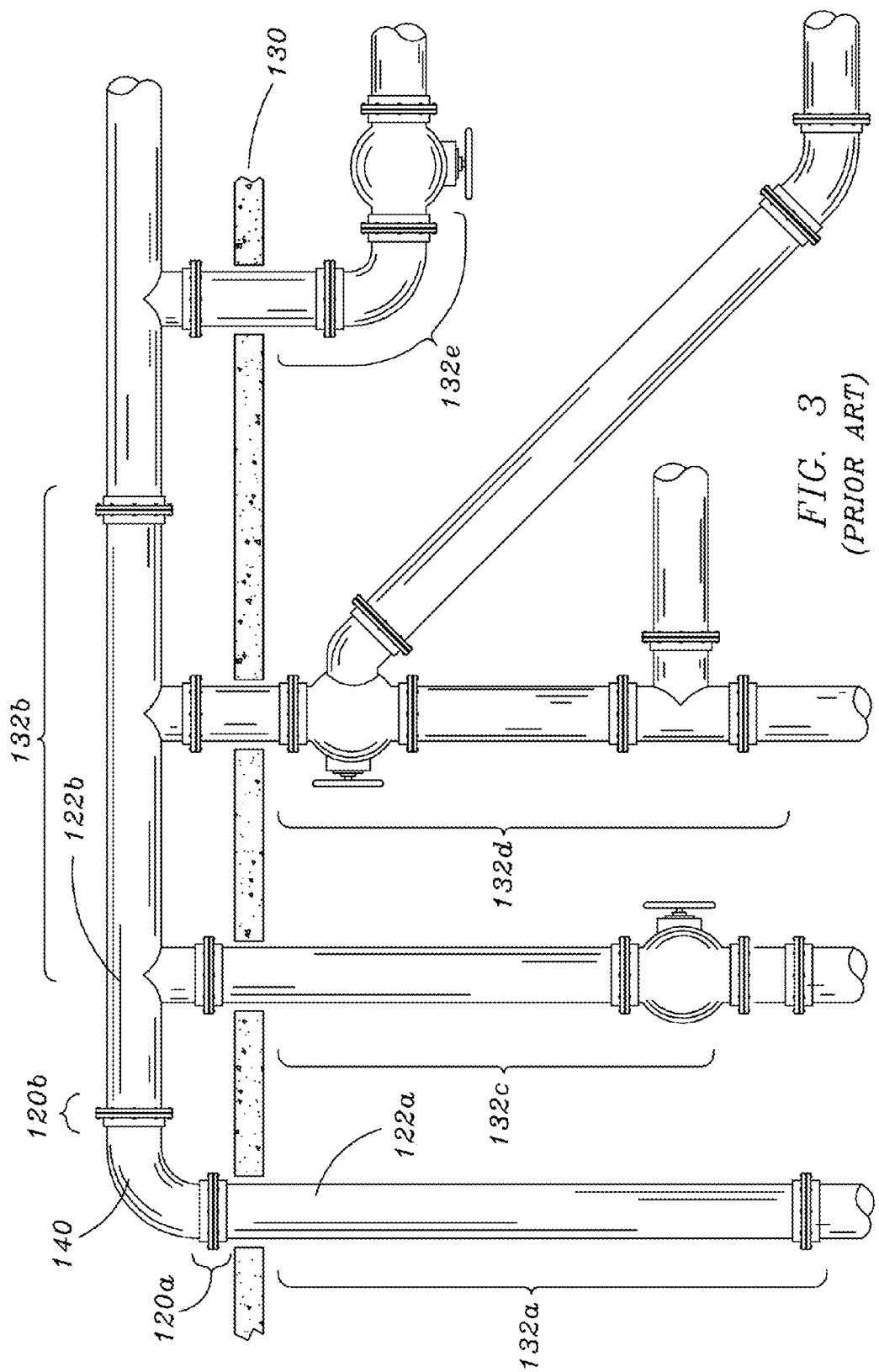
FIG. 3 is a prior art diagram of multiple flanged joints and connections.

In FIG. 3, flanged pipe section 122(a) of pipe run 132(a) must be run through wall 130. Pipe joint 120(a) connects flanged pipe section 122(a) to pipe spool piece 140, which in turn connects at pipe joint 120(b) to flanged pipe section 122(b) and pipe run 132(b). Pipe run 132(b) is designed to run parallel to wall 130, and pipe runs 132(c), 132(d) and 132(e) branch off from pipe run 132(b) at points along the length of wall 130. If the two flanges comprising pipe joint 120(a) are misaligned or force connected, the integrity or lifespan of pipe joint 120(a) may be compromised as shown above. However, if pipe joint 120(a) is misaligned or force-connected, its misalignment may affect pipe joint 120(b) as well; the two flanges at joint 120(b) may themselves require realignment or may not run precisely as blueprints intend. Therefore pipe run 132(b) may not be properly aligned with wall 130, and branching pipe runs 132(c), 132(d), and 132(e) may each develop alignment or leakage issues.

Figure 4A:
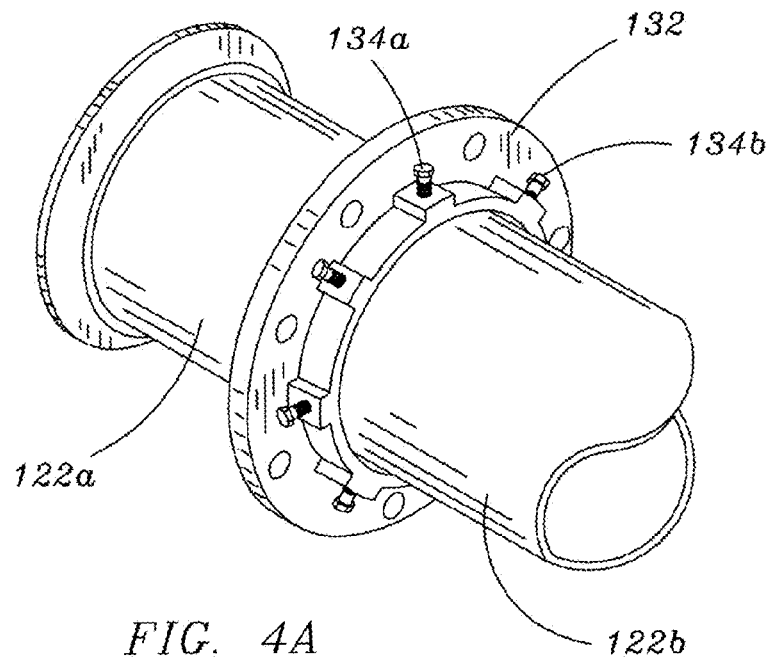
FIG. 4A is a prior art illustration of a restrained flange adapter.
Figure 4B:
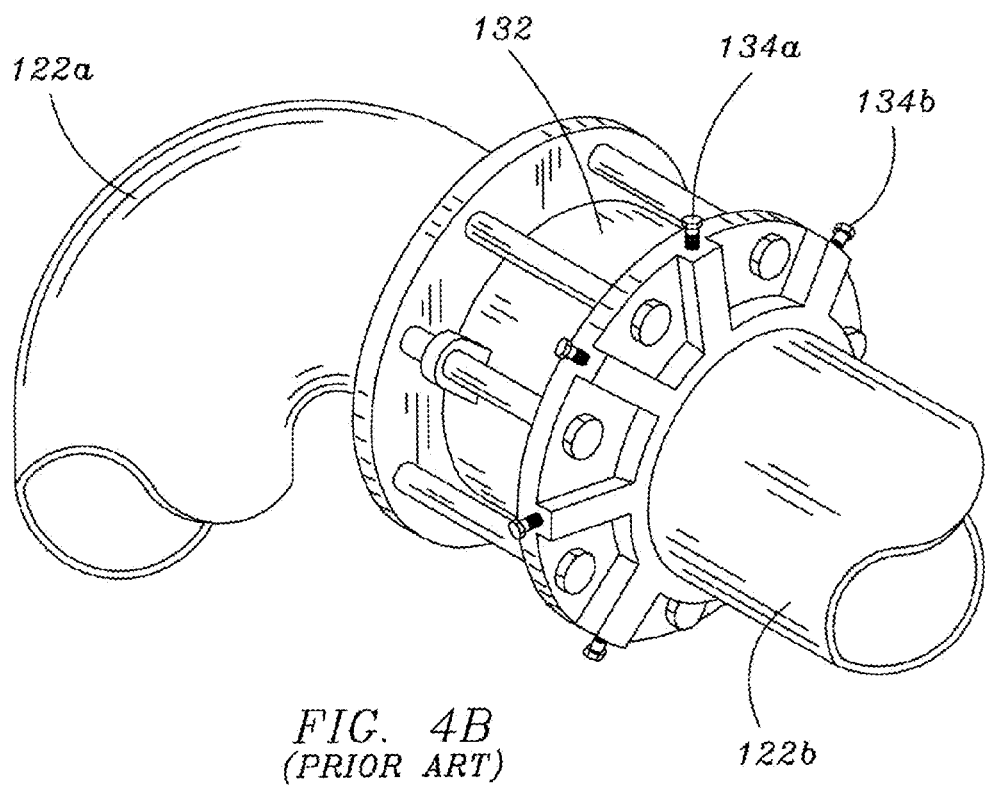
FIG. 4B is a prior art illustration of a restrained flange adapter.

FIGS. 4A and 4B depict prior art solutions to the problem of improperly two-holed and misaligned flanges, such as the Uniflange manufactured by Ford Meter Box, the MegaFlange manufactured by EBAA Iron, and other like restrained flange adapters. A flanged joint may be replaced by a restrained pipe joint 132 that connects pipe sections 122(a) and 122(b). A series of radially oriented set screws 134(a), 134(b), . . . secure the restrained pipe joint 132 to pipe 122(b) at points along the outer surface of pipe 122(b). While the problem of improper two-holing may be eliminated by restrained flange adapters of this type, other complications may arise. The pipe joint may still be vulnerable to leakage or strain if set screws 134(a), 134(b), . . . are unevenly or improperly torqued. Furthermore, the outer surface of pipe 122(*b*) may be vulnerable to point loading or distortion at spots where set screws 134(*a*), 134(*b*), . . . contact (and exert pressure upon) the outer surface. Similarly, corrosion may result from galvanic reaction of dissimilar metals, e.g., due to contact between carbon steel set screws 134(*a*), 134(*b*), . . . and the ductile iron outer surface of pipe 122(*b*).

Figures 5A, 5B:
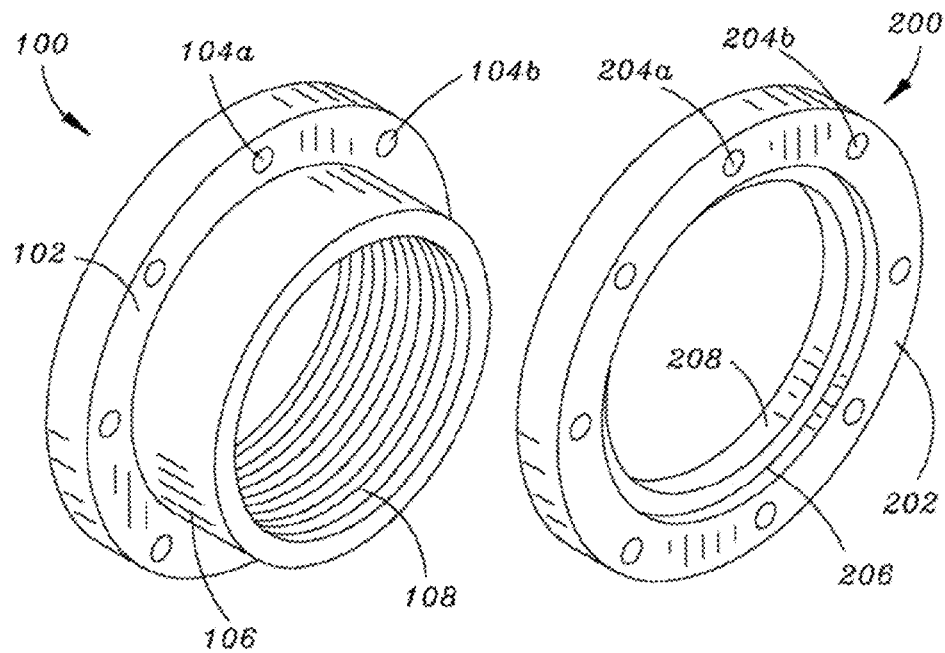
FIG. 5A is an illustration of a standard annular flange.
FIG. 5B is an illustration of a modified rotating flange.

FIG. 5A depicts a standard raised-face annular flange 100. Flange 100 may be fashioned from gray iron or, preferably, ductile iron. In one aspect, flange 100 includes a threaded inner surface 108 extending through raised face 106. Bolt holes 104(*a*), 104(*b*), . . . are evenly spaced in a concentric circle around the face 102 of flange 100.

FIG. 5B depicts a modified rotating flange 200 of an embodiment of the present invention. In one aspect, modified flange 200 may have an annular shape and a series of bolt holes 204(*a*), 204(*b*), . . . concentrically arranged around the perimeter of face 202. In a preferred embodiment of the present invention, modified flange 200 may be fashioned from ductile iron. In a further aspect, inner surface 208 of modified flange 200 may be unthreaded and may define an inner diameter slightly larger than the outer diameter of the pipe corresponding to modified flange 200. In a preferred embodiment of the present invention, a length of corresponding pipe may be inserted into the inner diameter of modified flange 200 so that modified flange 200 may rotate freely around the longitudinal axis of the pipe. In a further aspect, modified flange 200 may include an annular counterbore 206 adjacent to inner surface 208, expanding the inner diameter of modified flange 200 on one face 202.

Figure 5C:
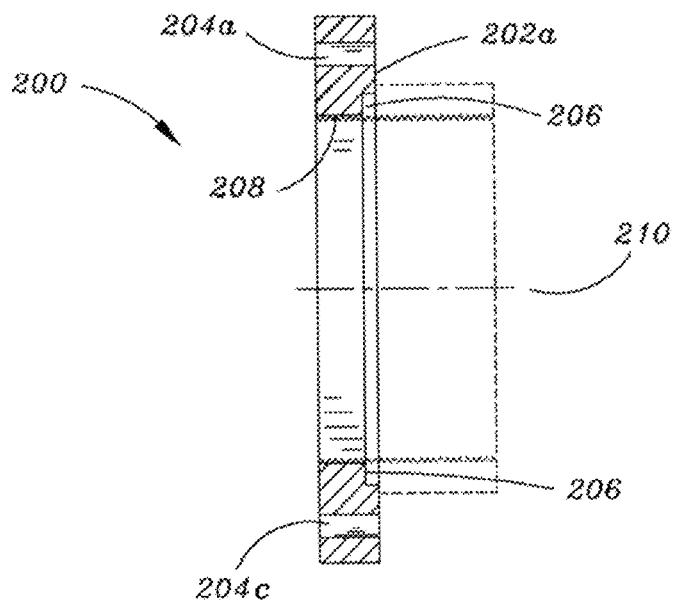
FIG. 5C is a side view of a modified rotating flange.

FIG. 5C depicts a side view of a modified rotating flange 200 of an embodiment of the present invention. Inner surface 208 of modified flange 200 defines an inner diameter slightly larger than that defined by the internal threading of a corresponding standard flange. In one aspect, annular counterbore 206 expands the inner diameter of modified flange 200 on face 202(*a*). In a preferred embodiment of the present invention, annular counterbore 206 has a longitudinal depth (i.e., as measured along longitudinal centerline 210 of modified flange 200) approximating the sum of the nominal thickness of the pipe corresponding to modified flange 200 and the nominal allowance for casting tolerance of the pipe, and a radial depth approximating the sum of twice the nominal thickness of the pipe and the nominal allowance for casting tolerance. In a further aspect, bolt holes 204(*a*) and 204(*c*) may rotate with modified flange 200 in order to uniformly fit any corresponding flange, whether or not the bolt holes of the corresponding flange are properly two-holed.

Figure 6A:
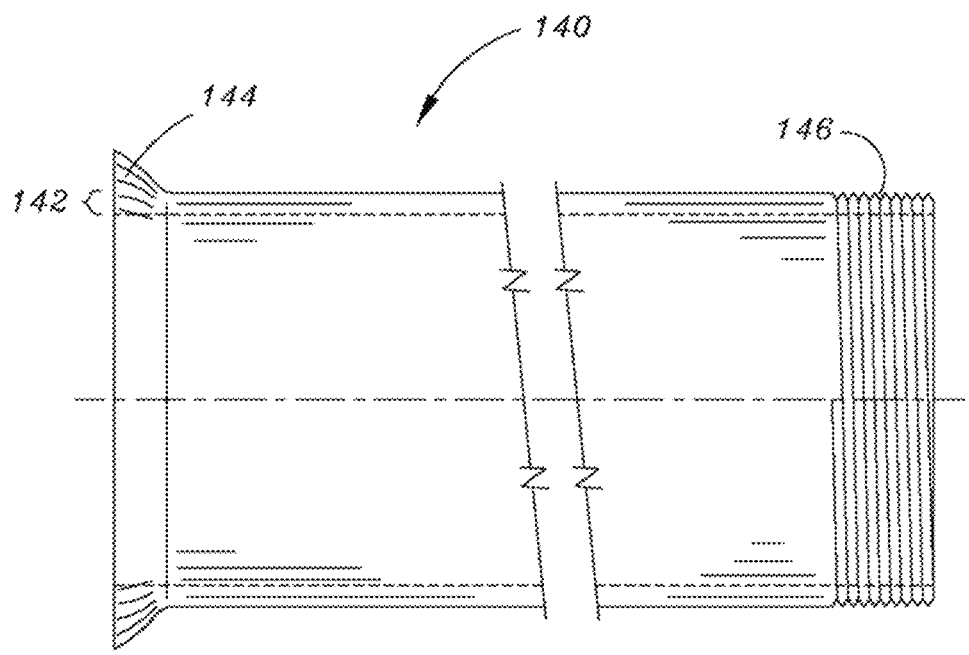
FIG. 6A is a side view of a pipe spool piece.

FIG. 6A depicts a side view of a pipe spool piece 140 corresponding to a modified flange of an embodiment of the present invention. In one aspect, pipe spool piece 140 may have a nominal thickness 142 corresponding to its nominal size, a flared bell end 144, and an externally threaded spigot end 146. In a preferred embodiment of the present invention, pipe spool 140 is fashioned from centrifugally cast hubless ductile iron pipe of special thickness class 53. In a further aspect, pipe spool 140 may be of any standard length. Alternatively, spigot end 146 may be cut and threaded so that pipe spool 140 may be customized to any reasonable or desirable length.

Figure 6B:
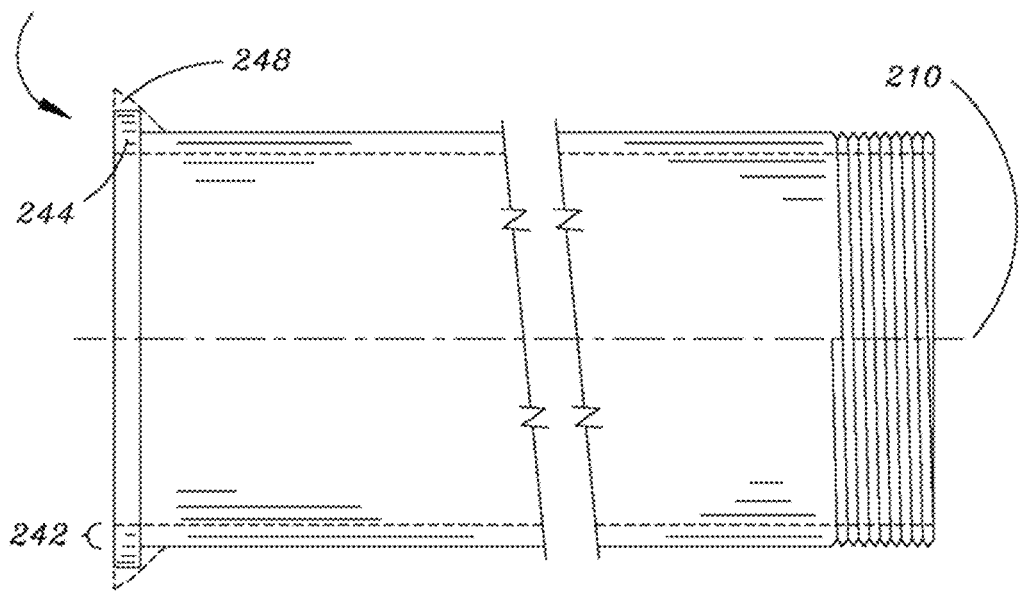
FIG. 6B is a side view of a modified pipe spool piece.

FIG. 6B depicts a side view of a modified pipe spool piece 240 in accordance with an embodiment of the present invention. In one aspect, the flared end of pipe spool 240 may be machined (via lathe, CNC lathe or any like device) to remove excess material 248 and produce an annular pipe stub 244. In a preferred embodiment of the present invention, pipe stub 244 may have a longitudinal thickness (i.e., measured parallel to longitudinal centerline 210) approximating the nominal thickness 242 of pipe spool 240 and a radial thickness twice its longitudinal thickness.

Figure 7:
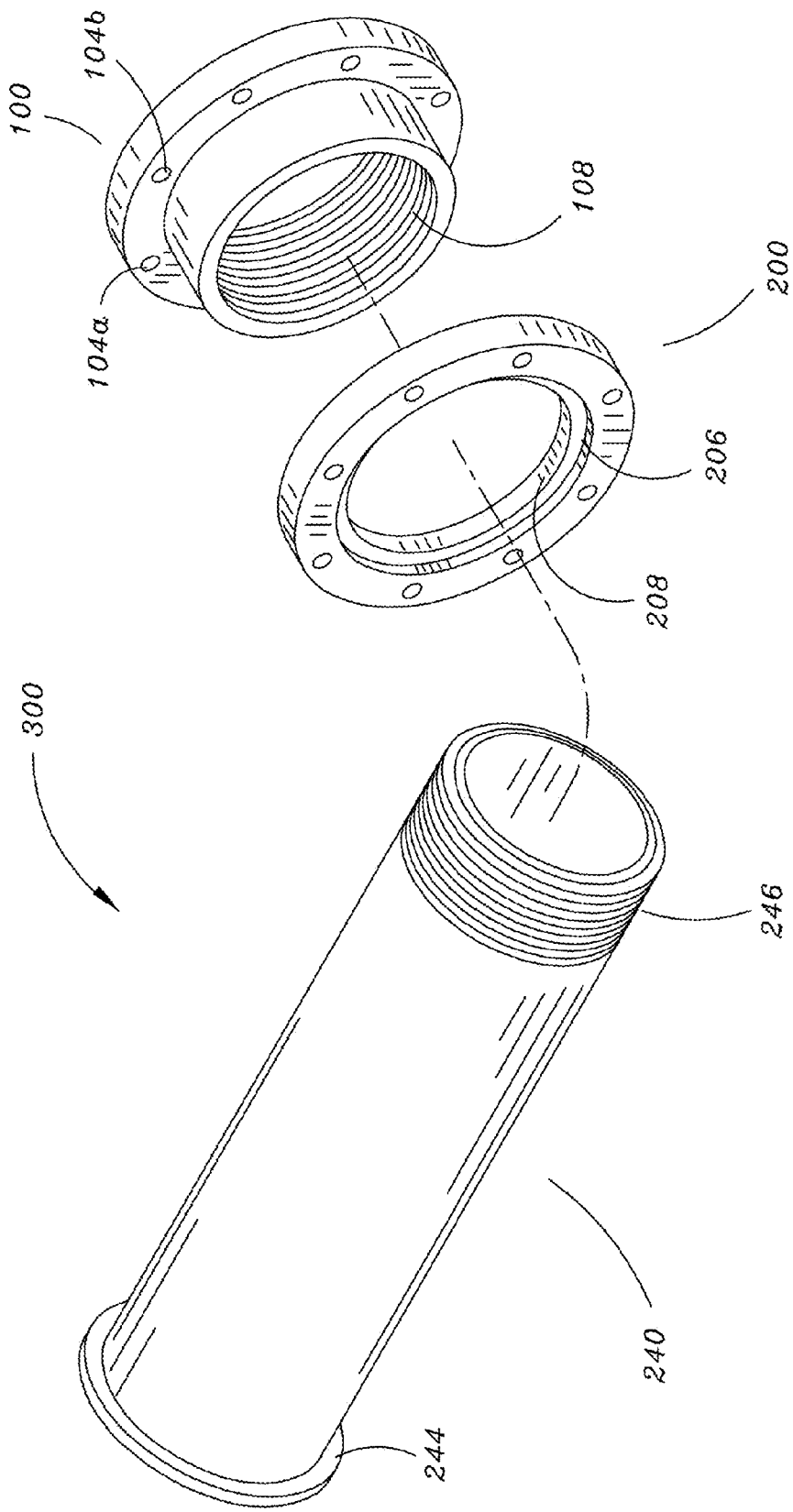
FIG. 7 is an exploded view of a restrained rotating flange device.

FIG. 7 depicts an exploded view of the assembly of a restrained rotating flange device 300 of an embodiment of the present invention. In one aspect, modified pipe spool 240 may have an externally threaded spigot end 246 and an annular pipe stub 244 at its bell end. In a second aspect, modified rotating flange 200 may be inserted around modified pipe spool 240 such that inner surface 208 of modified rotating flange 200 may freely rotate around the outer surface of modified pipe spool 240 and annular counterbore 206 faces pipe stub 244. In a third aspect, standard annular flange 100 may be inserted around modified pipe spool 240 such that internal threads 108 of flange 100 and external threads 246 of modified pipe spool 240 both secure flange 100 to modified pipe spool 240 and restrict the lateral movement of modified flange 200. In a preferred embodiment of the present invention, standard flange 100 is inserted onto modified pipe spool 240 such that bolt holes 104(*a*), 104(*b*) of flange 100 are properly two-holed. Consequently, even if restrained rotating flange device 300 is connected to an improperly two-holed flange at its stub end 244, modified flange 200 may rotate in order to align with and uniformly fit the improperly two-holed flange. Once modified rotating flange 200 is appropriately rotated and bolted to the improperly two-holed flange, standard flange 100 may present a properly two-holed flange for any pipe joint connected to standard flange 100 at spigot end 246.

Figure 8A:
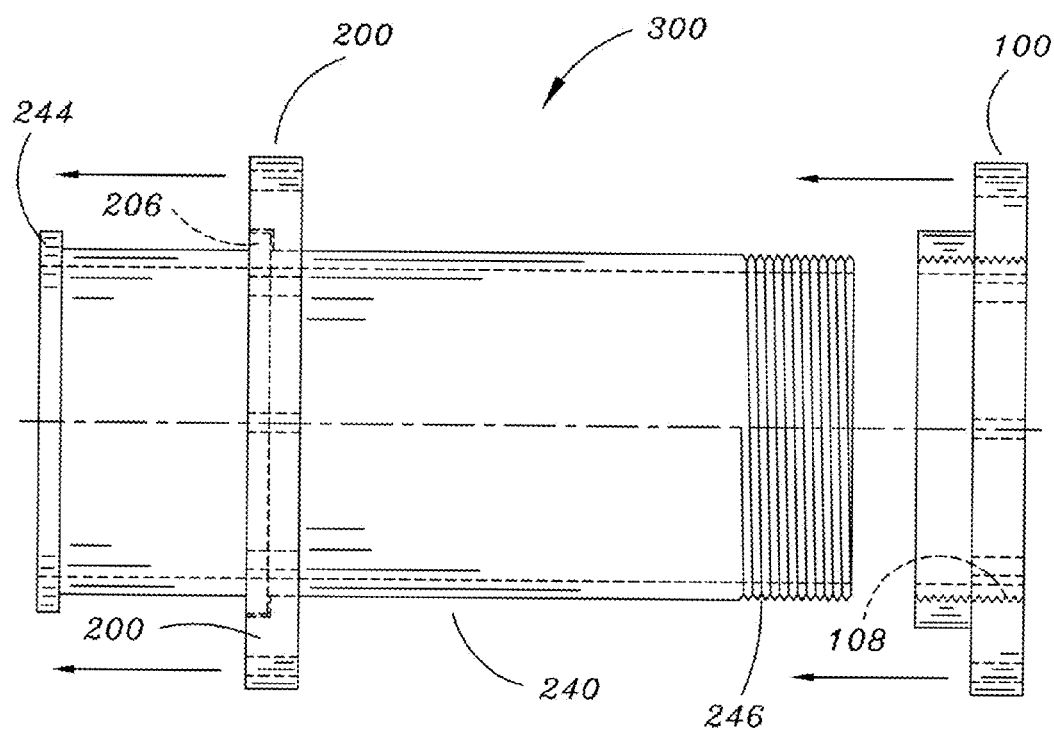
FIG. 8A is a side view of a restrained rotating flange device.
Figure 8B:
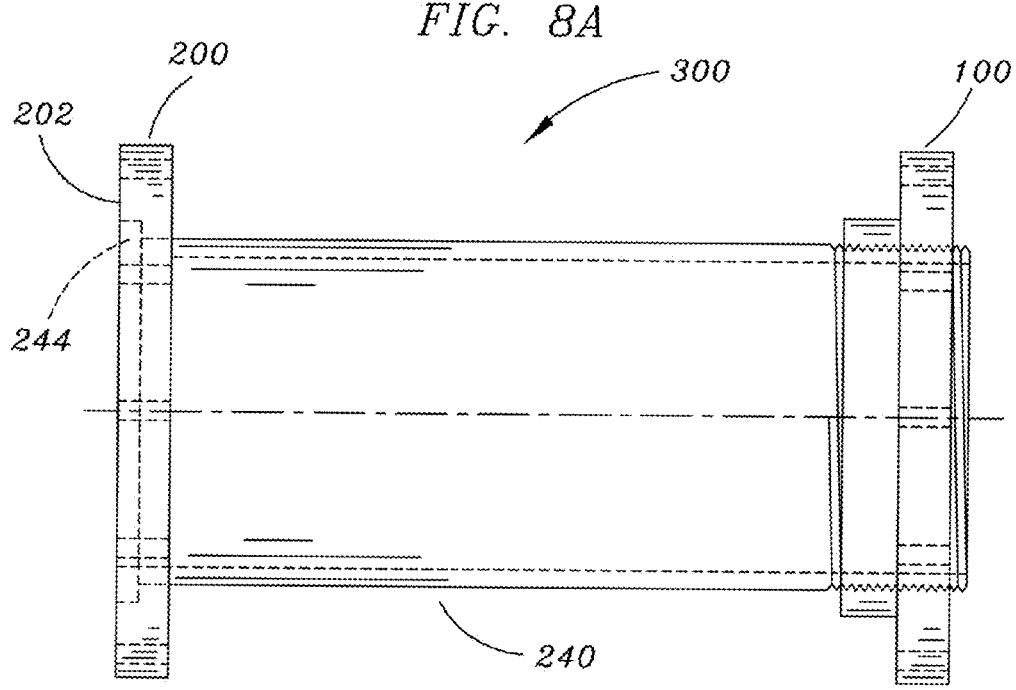
FIG. 8B is a side view of a restrained rotating flange device.
Figure 8C:
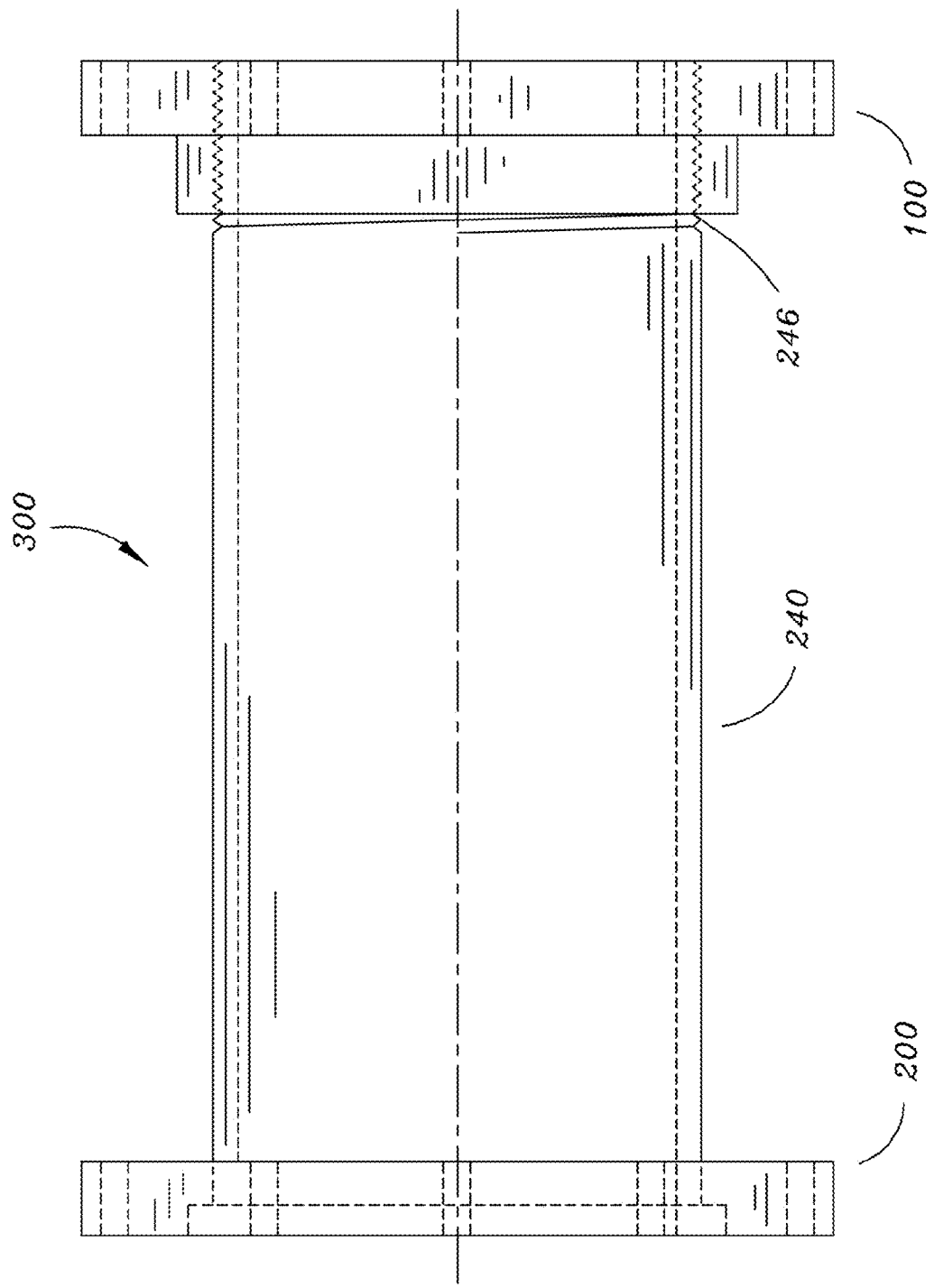
FIG. 8C is a side view of a restrained rotating flange device.

FIGS. 8A, 8B, and 8C depict a side view of the assembly of a restrained rotating flange device 300 of an embodiment of the present invention. In a first aspect, modified rotating flange 200 may be inserted around modified pipe spool 240, such that annular counterbore 206 faces pipe stub 244. One skilled in the art will recognize that the dimensions of annular counterbore 206 may slightly exceed those of pipe stub 244 due to the allowance for casting tolerance. Consequently, pipe stub 244 may recess into annular counterbore 206, and the face 202 of modified flange 200 may rest flush with the annular basal surface of pipe stub 244. In an exemplary embodiment of the present invention, pipe stub 244 may recess inside annular counterbore 206 such that an annular gap between the basal surface of pipe stub 244 and the face 202 of modified flange 200 corresponds to a concentric ring of an annular gasket sized to fit between modified flange 200 and modified pipe spool 240. In a further aspect, standard flange 100 is inserted around modified pipe spool 240 such that the internal threads 108 of flange 100 couple with the external threads 246 of pipe spool 240. In a preferred embodiment of the present invention, flange 100 is screwed onto modified pipe spool 240 to a pressure tolerance of 500 psi. Flange 100 may therefore restrict the lateral movement of modified flange 200, preventing modified flange 200 from falling off pipe spool 240 before bolting to a connecting flange. In a still further aspect, depicted in FIG. 8C, flange 100 may be rotated so as to rest flush with the spigot end 246 of pipe spool 240, or a length of pipe spool 240 projecting beyond flange 100 may be removed.

Figure 9:
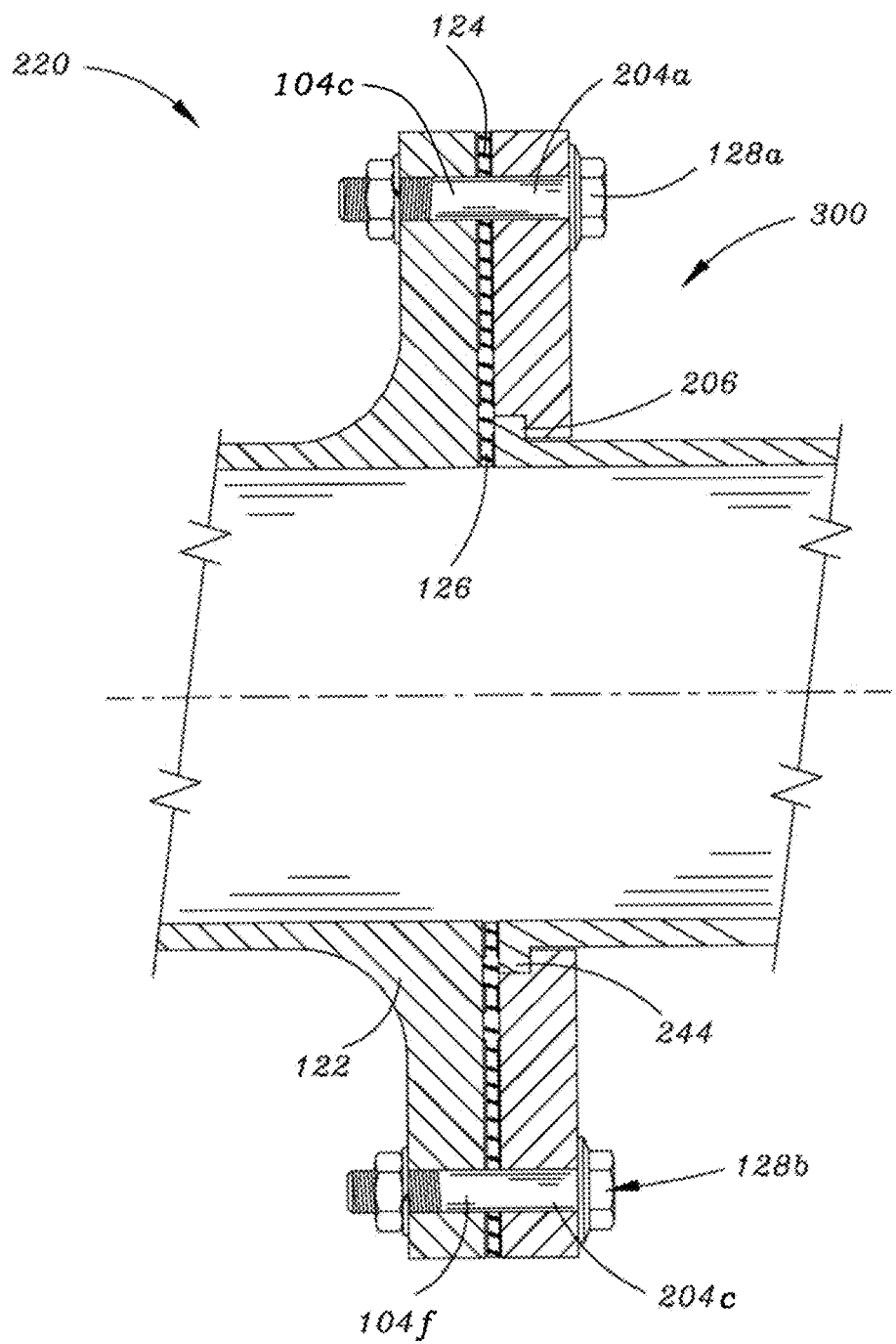
FIG. 9 is a cross section of a pipe joint including a restrained rotating flange device.

FIG. 9 depicts a cross section of a pipe joint 220 including a restrained rotating flange device 300 of an embodiment of the present invention. Bolts 128(*a*), 128(*b*) connect flange device 300 to flanged pipe 122 through bolt holes 204(*a*), 204(*c*) in modified rotating flange 200. As bolt holes 204(*a*), 204(*b*) in modified flange 200 align with bolt holes 104(*c*), 104(*f*) in flanged pipe 122, bolts 128(*a*), 128(*b*) are also perfectly aligned, and a stable, sealed pipe joint connection is provided. Gasket 124 is positioned between flange device 300 and flanged pipe 122 to secure the seal. In a preferred embodiment of the present invention, an annular gap between pipe stub 244 and annular counterbore 206 corresponds to concentric raised ring 126 of gasket 124.

Figure 10:
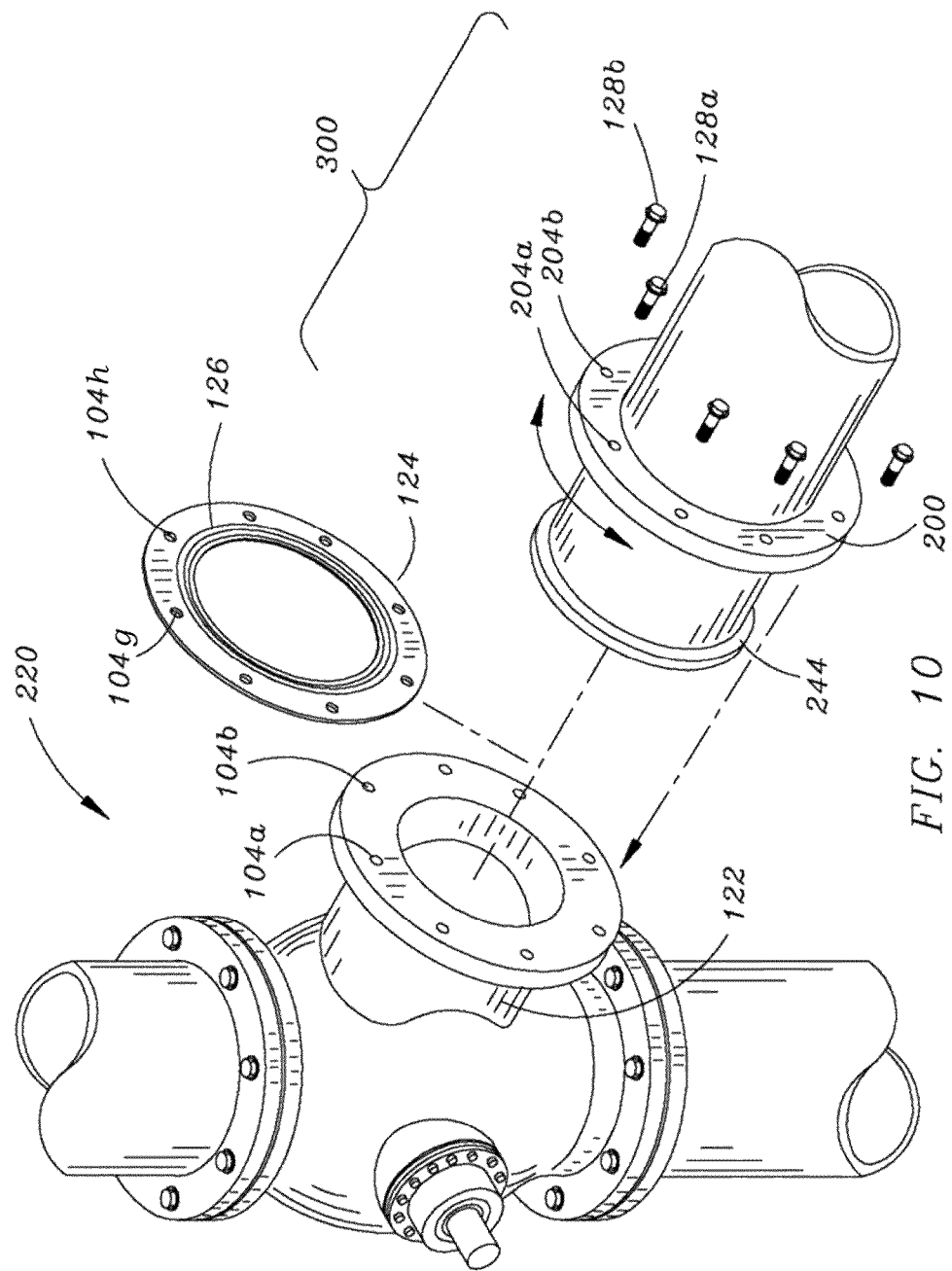
FIG. 10 is an exploded view of a pipe joint including a restrained rotating flange device.

FIG. 10 depicts an exploded view of a pipe joint 220 including a restrained rotating flange device 300 of an embodiment of the present invention. As pipe stub 244 of flange device 300 is brought into place to connect with flanged pipe 122, modified flange 200 may be rotated so that bolt holes 204(a), 204(b), . . . align precisely with bolt holes 104(a), 104(b), . . . in flanged pipe 122. Bolts 128(a), 128(b), . . . may then connect bolt holes 204(a), 204(b), . . . of modified flange 200, bolt holes 104(g), 104(h), . . . in annular gasket 124, and bolt holes 104(a), 104(b), . . . of flanged pipe 122, providing a sealed and stable pipe joint connection. In a preferred embodiment of the present invention, an annular gap between pipe stub 244 and the face of modified flange 200 corresponds to concentric raised ring 126 of annular gasket 124.

Referring generally to FIGS. 11A-E, the modified rotating flange 200a may be implemented and may function similarly to the modified rotating flange 200 of FIG. 5B, except that the modified rotating flange 200a may comprise a left flange piece 200b and a right flange piece 200c. The left flange piece 200b and right flange piece 200c may have a substantially semicircular basal surface, the two semicircular basal surface combining to form the basal surface, or face 202, of the modified rotating flange 200a. The left flange piece 200b and right flange piece 200c may be connected by a hinge 212 installed around, or in place of, the bolt hole 204a. The modified rotating flange 200a may thus be installed, for example, around the modified pipe spool 240 of FIG. 8B, even if a threaded flange 100 has been attached to the modified pipe spool 240.

Figure 11A:
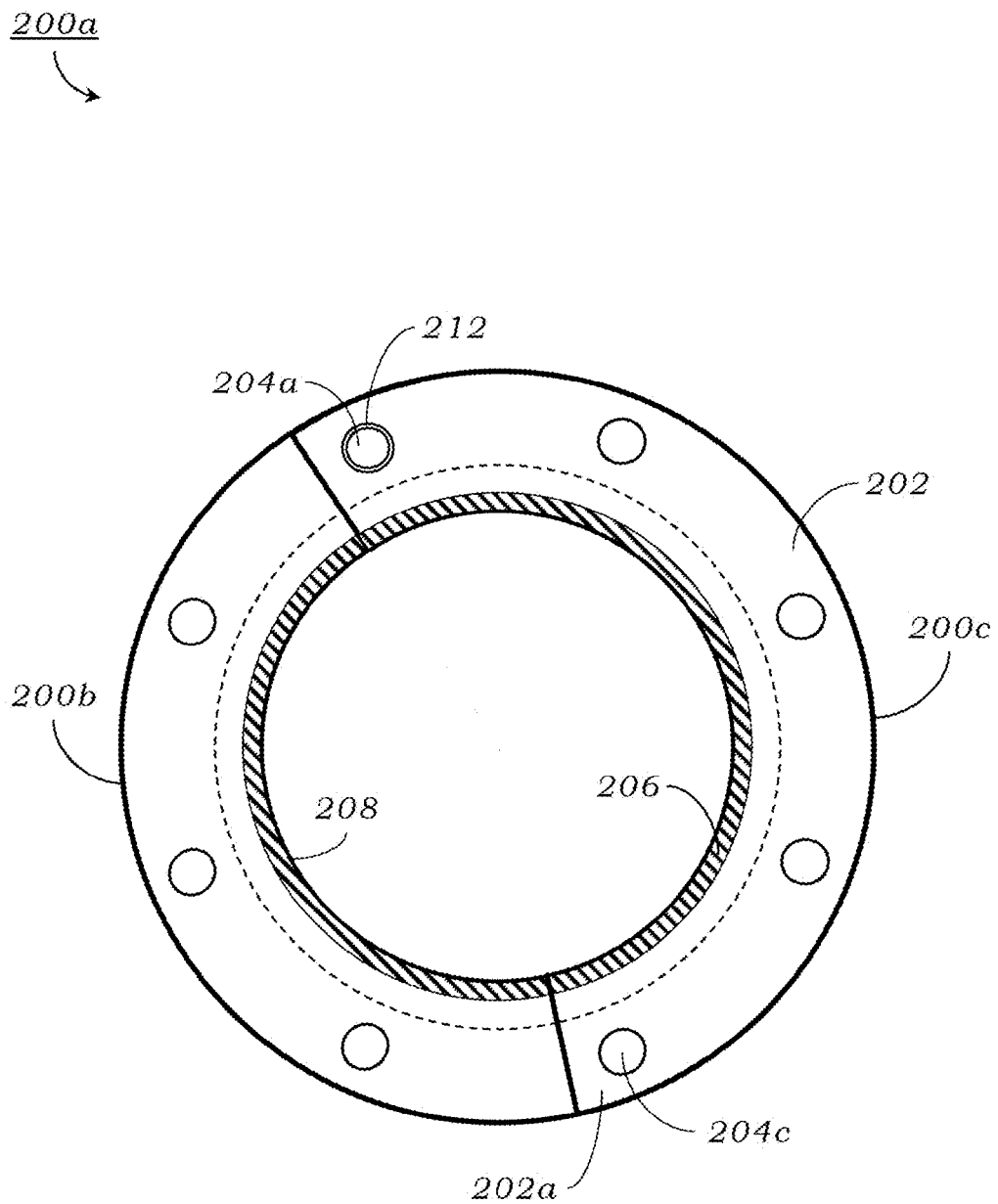
FIG. 11A is a front view of a modified rotating flange according to embodiments of the inventive concepts disclosed herein.
Figure 11B:
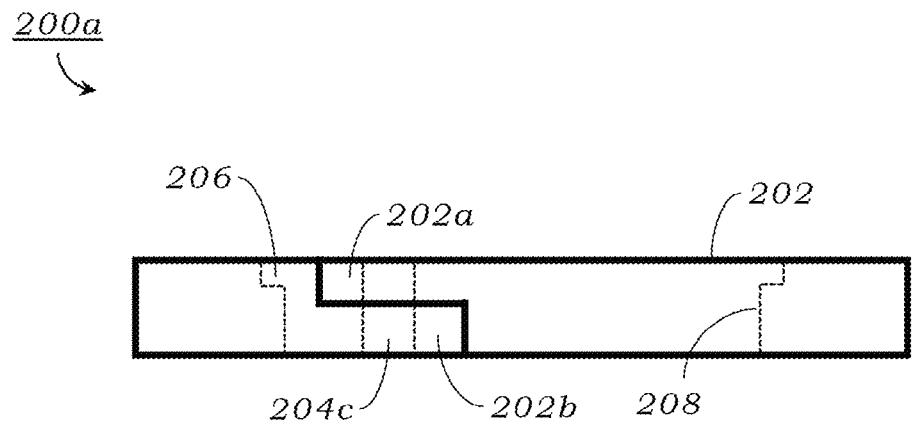
FIG. 11B is a bottom view of the modified rotating flange of FIG. 11A.
Figure 11C:
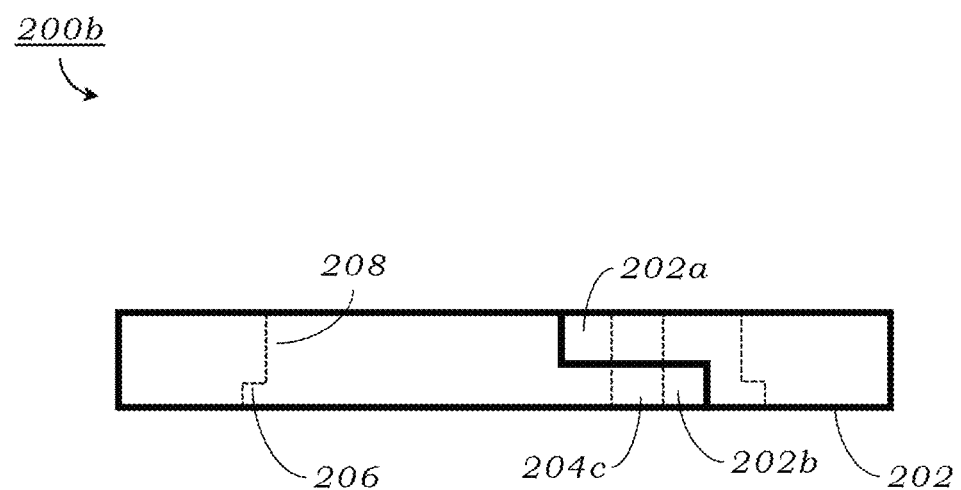
FIG. 11C is a bottom view of an alternative embodiment of the modified rotating flange of FIG. 11A.

Referring in particular to FIGS. 11B and 11C, the section of the modified rotating flange 200a where the left flange piece 200b and the right flange piece 200c may be characterized by a front portion 202a and a rear portion 202b. For example, when the left flange piece 200b and the right flange piece 200c are secured via the bolt hole 204c, the front portion 202a may rest flush with the rear portion 202b and forward of the rear portion 202b, relative to the front basal surface (front face 202) of the modified rotating flange 200a; the bolt hole 204c may be configured to align the front portion 202a and the rear portion 202b. It should be noted that the position of the front basal surface (front face 202) of the modified rotating flange 200a, and thus the relationship between the front portion 202a and the rear portion 202b, may be aligned with the annular counterbore 206, as shown by FIG. 11B, or opposite the annular counterbore, as shown by FIG. 11C.

Figure 11D:
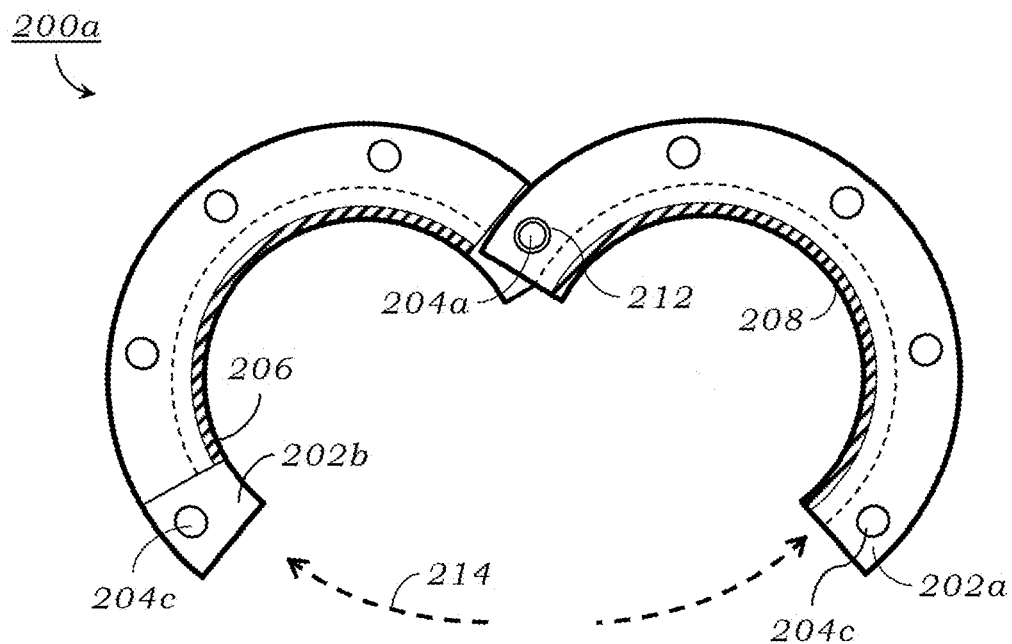
FIGS. 11D-11E are front views of the modified rotating flange of FIG. 11A.
Figure 11E:
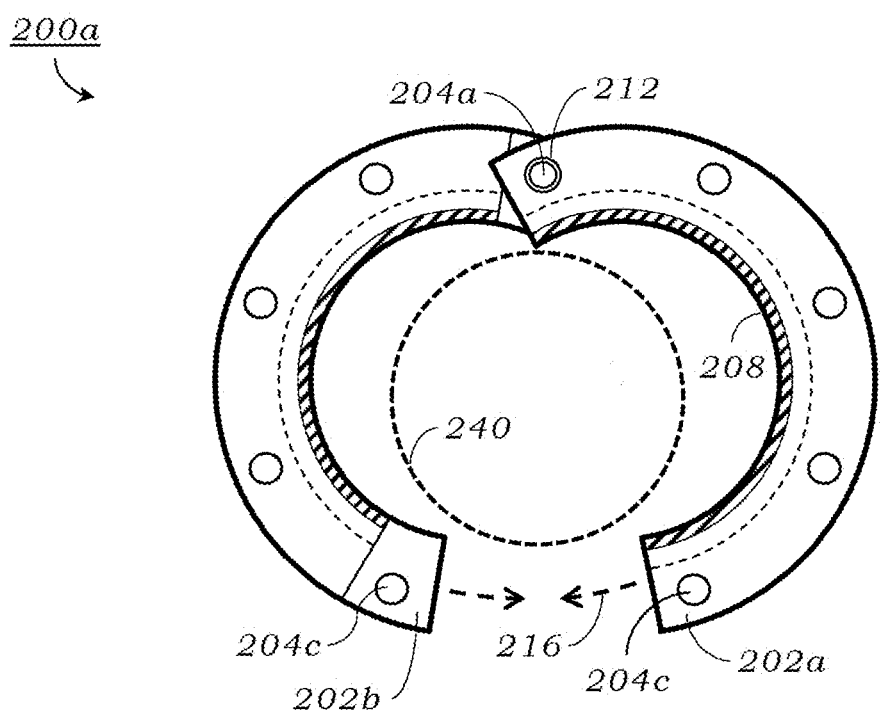

Referring in particular to FIGS. 11D and 11E, the modified rotating flange 100a may be installed around the modified pipe spool 240 (see, e.g., FIG. 8B) by rotating the left flange piece 200b and right flange piece 200c around the hinge 212, expanding (214) and contracting (216) the modified rotating flange 100a to fit around the outer diameter of the modified pipe spool (as shown by FIG. 11D in particular), and connecting the left flange piece 200b and right flange piece 200c (via front portion 202a and rear portion 202b) to each other via the bolt hole 204c opposite the bolt hole 204a. The installed modified rotating flange 100a may then slide freely parallel to the longitudinal centerline of the modified pipe spool 240 (see, e.g., FIG. 8A), as the inner surface 208 slightly exceeds the outer diameter of the modified pipe spool 240.

Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected", or "coupled", to each other to achieve the desired functionality, and any two components capable of being so associated can also be viewed as being "couplable", to each other to achieve the desired functionality. Specific examples of couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

I claim:

1. An annular ductile iron flange of nominal size, comprising an outer longitudinal surface, a non-threaded inner longitudinal surface, at least one basal surface, and a plurality of bolt holes evenly spaced around the at least one basal surface, wherein the improvement comprises:
   the inner longitudinal surface defining an inner diameter exceeding an outer diameter of a centrifugally cast length of hubless ductile iron pipe of said nominal size, the pipe having a nominal thickness and a nominal casting allowance, the flange configured to rotate longitudinally around the pipe;

the at least one basal surface including a first basal surface having an annular counterbore adjacent to said inner longitudinal surface, the counterbore having a longitudinal depth equivalent to the sum of the nominal thickness and the nominal casting allowance and a radial depth equivalent to between 1.5 and 2.5 times the sum of the nominal thickness and the nominal casting allowance; and the flange comprising a first flange segment and a second flange segment, the first flange segment and the second flange segment of semicircular shape and hingedly connected, the first flange segment and the second flange segment sharing at least one bolt hole of the plurality of bolt holes.

2. An annular flange of ductile iron having a nominal size, comprising:
an outer longitudinal surface;
an inner longitudinal surface defining a first inner diameter exceeding an outer diameter corresponding to a length of pipe of ductile iron having at least the nominal size, a nominal thickness and a nominal casting allowance;
at least one basal surface, the at least one basal surface including:
an annular counterbore adjacent to the inner longitudinal surface, the annular counterbore having a longitudinal depth equivalent to the sum of the nominal thickness and the nominal casting allowance and a radial depth equivalent to between 1.5 and 2.5 times the sum of the nominal thickness and the nominal casting allowance; and
a plurality of bolt holes evenly spaced in the at least one basal surface;
the annular flange comprising a first flange segment and a second flange segment, the first flange segment and the second flange segment of semicircular shape and hingedly connected, the first flange segment and the second flange segment sharing at least one bolt hole of the plurality of bolt holes.

3. The flange of claim 2, wherein the annular counterbore has a radial depth equivalent to the twice the sum of the nominal thickness and the nominal casting allowance.

4. A connector for ameliorating misalignment of flange connected ductile-iron pipes, comprising:
a length of hubless ductile-iron pipe having at least a nominal size, a nominal thickness, and a nominal casting allowance, said pipe having a flared bell end, an externally threaded spigot end, and an outer diameter;
a first annular flange of ductile iron having the nominal size and comprising:
a first outer longitudinal surface;
a first inner longitudinal surface configured to be threadedly connected to the spigot end;
at least one first basal surface; and
a plurality of first bolt holes evenly spaced in the at least one first basal surface;
a second annular flange of ductile iron having the nominal size and configured to rotate longitudinally around the pipe, the second annular flange comprising:
a second outer longitudinal surface;
a second inner longitudinal surface defining an inner diameter exceeding the outer diameter of the pipe;
at least one second basal surface, the at least one second basal surface including a third basal surface having an annular counterbore adjacent to the second inner longitudinal surface, the counterbore having a longitudinal depth equivalent to the sum of the nominal thickness and the nominal casting allowance and a radial depth equivalent to between 1.5 and 2.5 times the sum of the nominal thickness and the nominal casting allowance; and
a plurality of second bolt holes evenly spaced in the at least one second basal surface;
the second annular flange comprising a first flange segment and a second flange segment, the first flange segment and the second flange segment of semicircular shape and hingedly connected, the first flange segment and the second flange segment sharing at least one second bolt hole;
the bell end of the pipe machined to an annular pipe stub configured to recess into the annular counterbore, the pipe stub having a longitudinal thickness equivalent to the nominal thickness and a radial thickness equivalent to between 1.5 and 2.5 times the nominal thickness.

5. The connector of claim 4, wherein:
the radial depth of the counterbore is equivalent to twice the sum of the nominal thickness and the casting allowance; and
the radial thickness of the pipe stub is equivalent to twice the nominal thickness.

* * * * *